(12) United States Patent
Coric

(10) Patent No.: US 7,891,378 B2
(45) Date of Patent: Feb. 22, 2011

(54) FLUID DISTRIBUTION ASSEMBLY AND METHOD OF USE THEREOF

(75) Inventor: Philippe Coric, Orvault (FR)

(73) Assignee: EIF, Montreuil Sous Bois (FR)

( * ) Notice: Subject to any disclaimer, the term of this patent is extended or adjusted under 35 U.S.C. 154(b) by 956 days.

(21) Appl. No.: 11/727,070

(22) Filed: Mar. 23, 2007

(65) Prior Publication Data

US 2007/0227602 A1 Oct. 4, 2007

(51) Int. Cl.
*F15B 13/00* (2006.01)
(52) U.S. Cl. ....................... 137/884; 137/269
(58) Field of Classification Search ............... 137/269, 137/270, 884, 271
See application file for complete search history.

(56) References Cited

U.S. PATENT DOCUMENTS

| | | | | |
|---|---|---|---|---|
| 2,752,228 A | | 6/1956 | Gould | |
| 3,589,387 A | * | 6/1971 | Raymond | 137/884 |
| 5,273,074 A | * | 12/1993 | Conradt et al. | 137/269 |
| 5,341,846 A | | 8/1994 | Framberg | |
| 5,605,179 A | * | 2/1997 | Strong et al. | 137/884 |
| 6,125,887 A | * | 10/2000 | Pinto | 137/884 |
| 6,192,938 B1 | * | 2/2001 | Redemann et al. | 137/271 |
| 6,298,881 B1 | * | 10/2001 | Curran et al. | 137/884 |

FOREIGN PATENT DOCUMENTS

| | | |
|---|---|---|
| DE | 42 26 445 A1 | 2/1994 |
| DE | 103 22 452 A1 | 6/2004 |

\* cited by examiner

*Primary Examiner*—Kevin L Lee
(74) *Attorney, Agent, or Firm*—Sughrue Mion, PLLC

(57) ABSTRACT

A fluid distribution assembly includes modules for channelling fluid and for mounting components a body having at least one support face for supporting the modules, the support face having a regular network of elements for fixing the modules. A passage for fluid is provided inside the body. The assembly finds application in the analysis of fluids circulating in industrial installations.

29 Claims, 3 Drawing Sheets

FLUID DISTRIBUTION ASSEMBLY AND METHOD OF USE THEREOF

BACKGROUND OF THE INVENTION

The present invention concerns a fluid distribution assembly, of the type having modules for channelling fluid and for mounting functional components intended to interact with the fluid, and a body having at least one support face for supporting the modules, the said support face having a regular network of fixing elements.

The invention applies, for example, to the analysis or measurement of characteristics of fluids circulating in industrial installations for this purpose, assemblies of the aforesaid type are used. The body is constituted by a thin plate. The fixing means are threaded holes which pass through the plate and are distributed according to one of the two possibilities provided for by standard ANSI/ISA-76.00.02-2002.

The holes are therefore distributed so as to form squares, and the spacing between two holes of the same square may be 37 mm or 56 mm.

Thus it is possible to fix on the plate, fluid channelling modules having dimensions which are also standardised. The modules are thus substantially in the shape of a parallelepiped with square base, the sides of which have a length of 38.2 mm if the first possibility is selected or, respectively, 57.2 mm if the second possibility is selected.

The modules have internal channels and are arranged one after the other, being connected by connecting members, in order to effect the channelling of the fluid. The modules also serve for the mounting of functional components intended to interact with the fluid, such as valves, taps, pressure gauges, transducers, sensors, etc.

Owing to the above-mentioned standard, the perforated plates, the modules and the components are interchangeable, whoever their manufacturers, thus making it possible in particular to guarantee reduced costs.

In order to analyse a fluid, for example in an industrial installation, the fluid distribution assembly, equipped with the appropriate functional components, may be arranged downstream of a branch connection made on the pipe of the installation in which the fluid to be analysed circulates. A filter is generally provided between the branch connection and the fluid distribution assembly, in order to avoid polluting the analysis and measurement components.

Such known distribution assemblies prove satisfactory, but it is still desirable to reduce their overall dimensions.

SUMMARY OF THE INVENTION

It is therefore an aim of the invention to solve this problem by providing a distribution assembly of the aforesaid type which is of more reduced overall dimensions.

To this end, the subject of the invention is an assembly of the aforesaid type, characterized in that a passage for the fluid is provided inside the body.

According to particular embodiments, the invention may comprise one or more of the following features, taken singly or in all the technically possible combinations:

the body has at least two support faces, each of which faces has a regular network of fixing means for the modules;
  the fluid passage and the or each support face extend in a longitudinal direction;
  the body has a polygonal cross-section, the or each support face forming one side of the polygon;
  the body has as many support faces as the polygon has sides;
  the fluid passage passes through the body from side to side;
  the fixing means are holes provided in the or each support face of the body;
  the fixing means are distributed at the corners of squares;
  the squares have sides with a length of 37 mm or 56 mm;
  the assembly further comprises functional components intended to be fixed on the or each support face by means of the fixing means in order to interact with the fluid; and
  the assembly comprises a filter for filtering the fluid, which filter is carried by the body.

The invention also has as its subject the use of an assembly such as defined above for distributing a supply fluid for an engine of a vessel.

According to one variant, the fluid is oil.

BRIEF DESCRIPTION OF THE DRAWINGS

The invention will be more easily understood on reading the following description, provided solely by way of example, with reference to the appended drawings, in which.

DETAILED DESCRIPTION OF THE PREFERRED EMBODIMENTS

Figure 1:
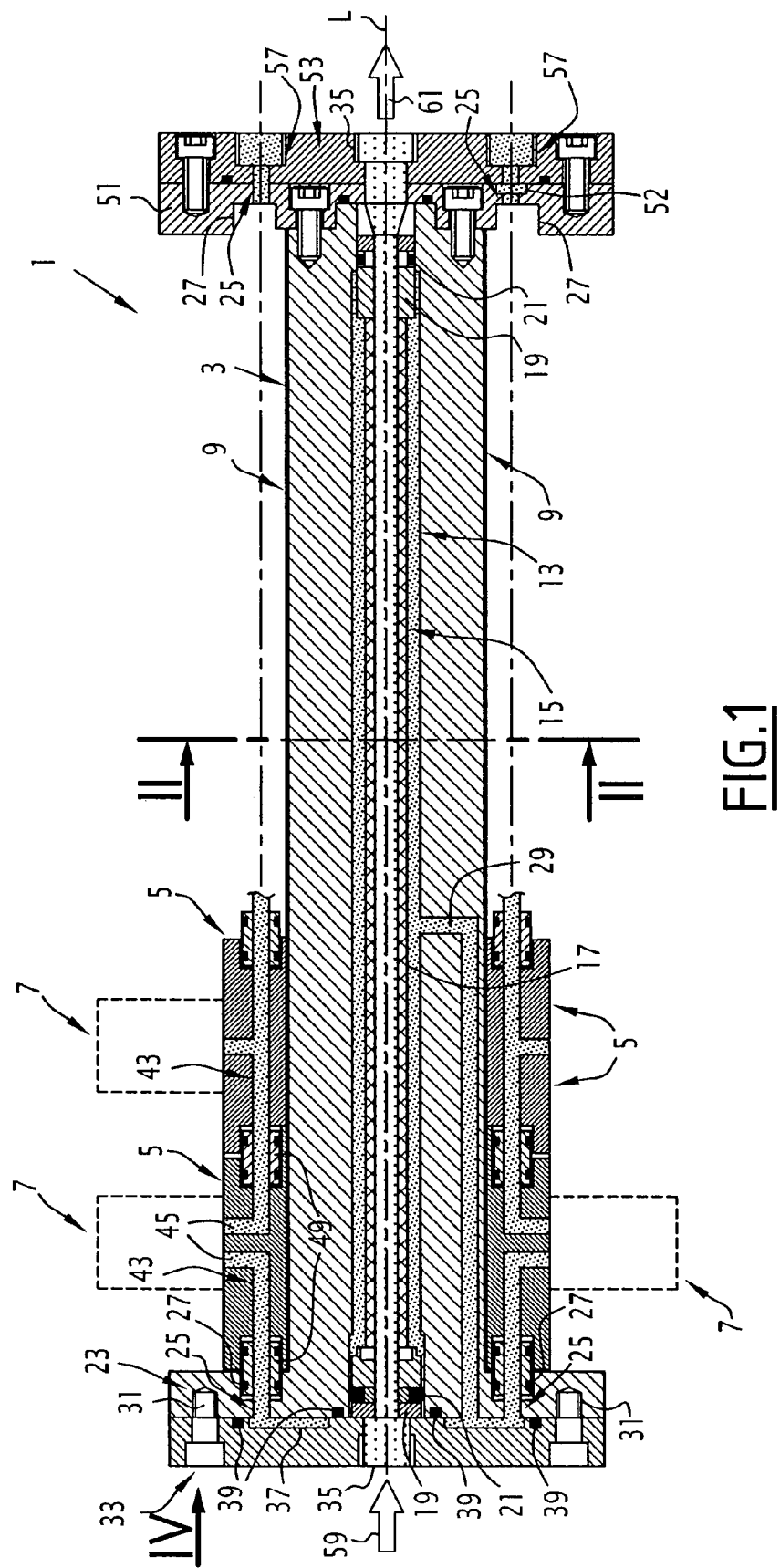
FIG. 1 is a diagrammatic view in longitudinal section of a fluid distribution assembly according to the invention.

FIG. 1 shows a fluid distribution assembly 1 which principally comprises a body 3, fluid channelling modules 5 and functional components 7 intended to interact with the fluid. More precisely, the components 7 are components for treating and/or measuring and/or analysing the fluid or its flow.

Figure 2:
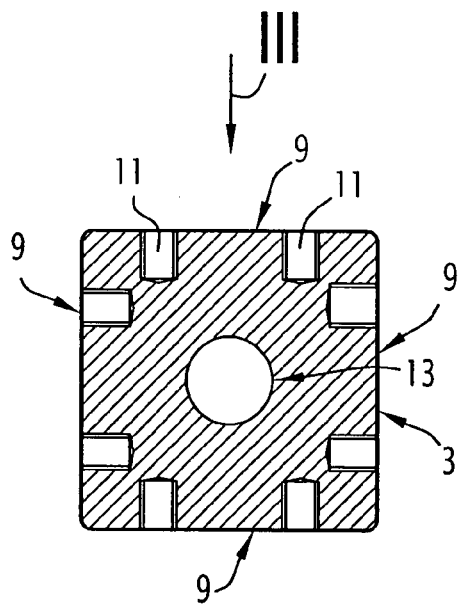
FIG. 2 is a diagrammatic section, along the line II-II in FIG. 1, and illustrating the body of the assembly of FIG. 1.
Figure 3:
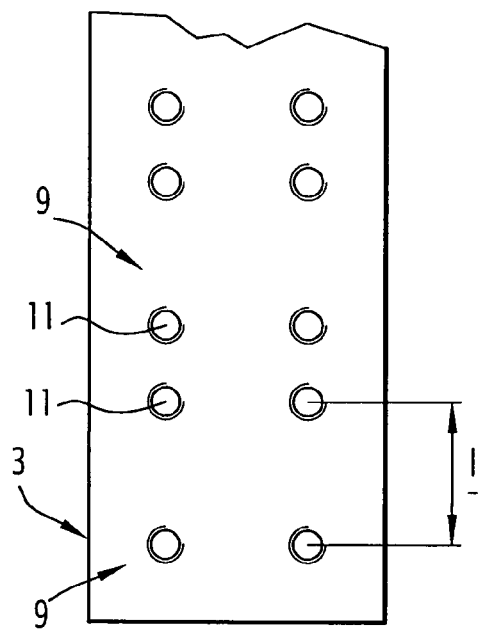
FIG. 3 is a partial top view of a support face of the body of the assembly of FIG. 1.
Figure 4:
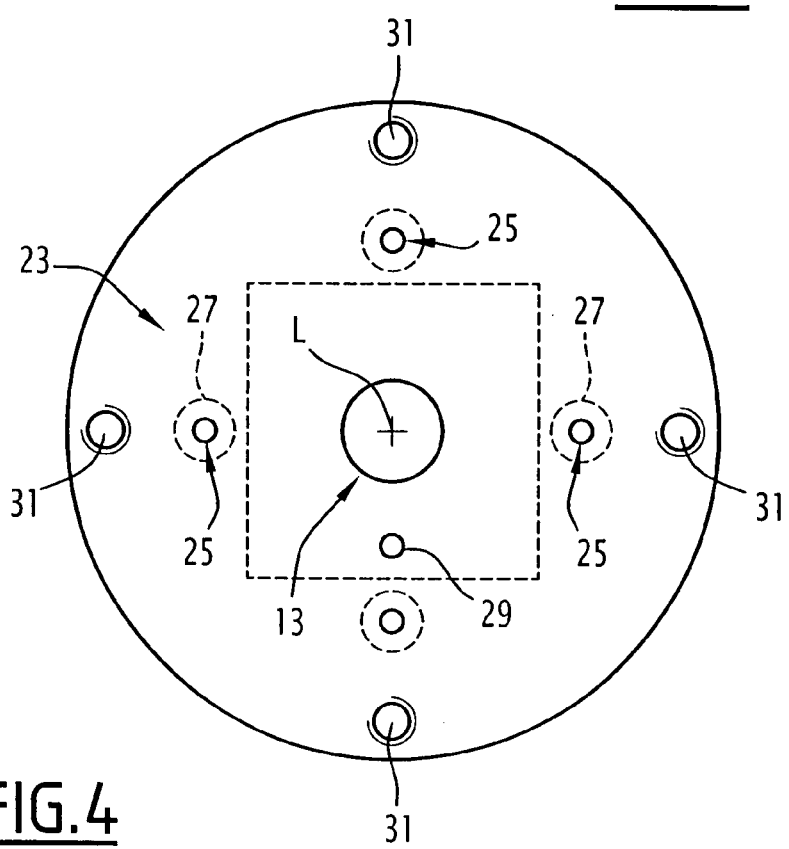
FIG. 4 is a diagrammatic front view of the left-hand flange of the body of the assembly of FIG. 1, seen in the direction of the arrow IV.

The body 3 extends along a longitudinal axis L. It has a substantially cylindrical shape of square section. Thus, the body 3 has four faces 9 (FIG. 2), each of which corresponds to one side of the said square.

Each face 9 is provided with a regular network of threaded fixing holes 11. The network complies with standard ANSI/ISA-76.00.02-2002. Thus, the sides of the squares connecting the axes of the holes 11 may have a length l of 37 mm, if the first possibility of this standard is selected.

As will be seen hereinafter, the network of holes 11 makes it possible to fix on the faces 9 modules 5, also conforming to standard ANSI/ISA-76.00.02-2002, that is to say, modules 5 which, seen from above, have a substantially square shape with a side length L of 38.2 mm, if the first possibility of the standard is selected.

The body 3 is traversed by a main fluid circulation passage 13 which extends, inside the body 3, along the axis L. In the example shown, the main passage 13 is substantially centered in the body 3.

Also in the example shown, the main passage 13 receives a filter 15 which comprises a radial filtering member 17 and two hollow plugs 19. The plugs 19 are inserted into the ends of the passage 13 and are provided with seals 21. The plugs 19 enclose longitudinally between them the filtering member 17, maintaining it radially at a distance from the side wall of the main passage 13. In another variant, the plugs 19 may be welded to the filtering member 17.

A first end of the body 3 (on the left in FIG. 1) is extended by a first flange 23 for holding the modules 5. The flange 23 is integral with the body 3.

The first flange 23 is traversed by four openings 25 for feeding the fluid towards the modules 5. These openings 25 are for example evenly distributed angularly around the axis L. The openings 25 are stepped and thus have widened portions 27 which are oriented towards the rest of the body 3, that is to say, towards the right in FIG. 1.

An auxiliary passage 29 for the fluid is also provided in the body 3. The passage 29 opens out at one end into the side wall of the main passage 13, substantially in a middle region of the body 3, then the auxiliary passage 29 extends longitudinally towards the flange 23, passes through the latter and opens to the outside.

The flange 23 further includes openings 31 for fixing a closure plate 33 onto the flange 23. These openings 31 may be distributed in a similar manner to the openings 25 and be arranged in the flange 23 radially further out than the openings 25.

The closure plate 33 is traversed by a central opening 35 which communicates with the inside of the plug 19 arranged opposite (on the left in FIG. 1), the inside of the plug 19 communicating with the inside of the filtering member 17.

The plate 33 holds the plug 19 in place inside the passage 13.

A countersink 37 is provided in the face of the closure plate 33 arranged opposite the flange 23. This countersink 37 places the auxiliary passage 29 and the openings 25 in communication and is, for example, in the shape of a ring.

Sealing gaskets 39 may be provided in the opposed faces of the flange 23 and of the closure plate 33.

All the modules 5 have similar structures and only one will be described hereinafter with reference to FIG. 5.

As indicated previously, the module 5 is perfectly conventional and conforms to standard ANSI/ISA-76.00.02-2002. It will therefore be described only briefly. The module 5 is a block substantially in the shape of a parallelepiped which in top view has a substantially square shape, the angles of which are provided with seats 41 intended to receive fixing screws for fixing the module 5 on one of the faces 9 of the body 3 by screwing into its holes 11.

Figure 5:
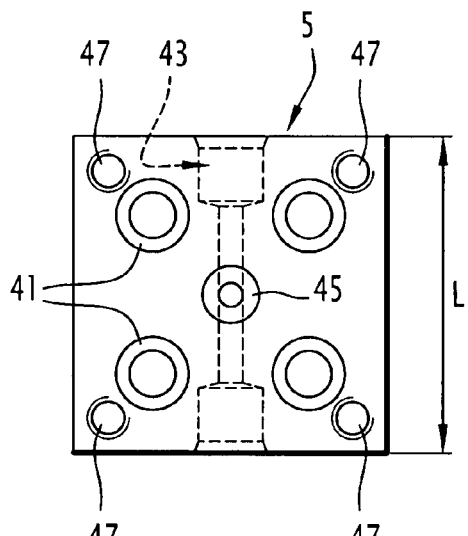
FIG. 5 is a diagrammatic top view of a fluid channelling module of the assembly of FIG. 1.

In the example shown in FIG. 5, the module 5 is pierced by a channel 43 intended to be traversed by the fluid and which passes through the module 5 from side to side. The channel 43 opens out into the upper face of the module 5 through an opening 45 which will serve to feed a component 7 mounted on the module 5 via four threaded holes 47 arranged in a square in the module 5.

As is also conventional, the modules 5 used in the assembly of FIG. 1 may have shapes and numbers of channels 43 or openings 45 different from those of the module 5 shown in FIG. 5.

In the assembly of FIG. 1, each face 9 is equipped with modules 5 which are aligned one after the other along the longitudinal axis L. In some applications, however, some faces 9 may be unused. Communication between the different modules 5 and with the widened portions 27 of the openings 25 of the first flange 23 is effected in a conventional manner by connecting members 49 inserted into the ends of the channels 43 and into the portions 27.

Also conventionally, components 7 are mounted on the modules 5.

It will be observed that only some of the modules 5 and of the components 7 have been shown in FIG. 1.

Figure 6:
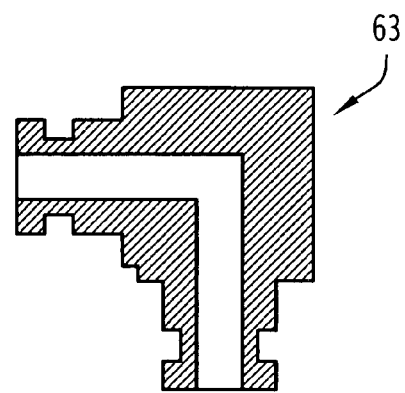
FIG. 6 is a diagrammatic sectional view of a connecting member which may be used with the assembly of FIG. 1.

The component 7 at the top left in FIG. 1 may for example be a valve, the following component 7 on the right may be a pressure gauge, and the bottom component 7 on the left may be a filter cleaner. Thus, on each face 9 a circuit is formed, the whole of the circuits making it possible to carry out the required measurements and analyses of the fluid. It will be noted that elbowed connecting members 63 (FIG. 6) may be used in some variants to connect to one another modules 5 provided on adjacent faces 9 and therefore the circuits which they carry.

The body 3 is provided at its second end (on the right in FIG. 1) with a second flange 51 for holding the modules 5. The flange 51 is screwed onto the body 3 and, like the flange 23, has four openings 25 terminating in flared portions 27. The flange 51 holds the straight plug 19 in place in the main passage 13.

Connecting members 49 (not shown) are engaged in the portions 27 of the second flange 51 and the modules 5 located furthest on the right in FIG. 1. A connecting member 49 is arranged between the modules of each pair of modules 5. It will additionally be recalled that connecting members 49 are arranged between the first flange 23 and the modules 5 located furthest on the left in FIG. 1.

The modules 5 are therefore on the one hand fixed on the faces 9 by screwing into the holes 11, and on the other hand held longitudinally via the connecting members 49 and the flanges 23 and 51.

In the example shown, a countersink 52 extending over about 180° around the axis L connects the lower opening 25 and the two middle openings 25 of the second flange 51. This countersink 52, for example in the shape of a sector of a crown, is closed by a closure plate 53 fixed on the flange 51. The plate 53 has a central opening 35, similar to the opening 35 of the plate 33, and two stepped fluid passage openings 57 which have passed through the modules 5. One of these openings 57 is located opposite the upper opening 25 and communicates with the latter. The other opening 57 is located opposite the lower opening 25 of the flange 51 and communicates with the opening 25 and the countersink 52.

The assembly 1 of FIG. 1 is for example arranged on a branch loop of the oil supply circuit of the engine of a vessel, for example an oil tanker.

The fluid circulating in the branch loop, in the present instance oil, penetrates into the left-hand opening 35 as represented by the arrow 59 in FIG. 1. Part of the fluid flows longitudinally inside the filtering member 17 and emerges through the other opening 35, as represented by the arrow 61, before being returned towards the remainder of the branch loop and then towards the supply circuit of the engine. The body 3 thus forms a portion of the branch loop.

Another part of the fluid having penetrated into the filtering member 17 is filtered while passing radially through the filtering member 17, then circulates in the auxiliary passage 29 and is returned through the countersink 37 to the openings 25 of the flange 23. This other part of the fluid feeds the alignments of module 5 provided on each face 9. The fluid then passes through the circuits formed on each of the faces 9 through the modules 5 and the components 7 where the required measurements and analyses are carried out.

The fluid is then collected on the one hand by the upper openings 25 of the flange 51 and of the plate 53 and on the other hand by the lower and middle openings 25 of the flange 51, by the countersink 52 and by the lower opening 57 of the plate 53. The collected fluid is then returned towards the branch loop and the oil supply circuit.

It will be observed that the upper opening 57 of the plate 53 may be dedicated, for example, to the evacuation of a polluted fraction of the fluid, in which case this fraction is not returned towards the branch loop or the main circuit. It will also be noted that, according to requirements, the countersink 52 may for example connect only two openings 25, that another countersink 52 may be used simultaneously, that no countersink 52 may be provided, etc.

The assembly 1 of FIG. 1 has particularly reduced overall dimensions.

This is due on the one hand to the fact that the body 3 itself has an inner passage 13 intended for the circulation of the fluid, and on the other hand to the fact that the body 3 has a plurality of support faces 9 for supporting the modules 5 arranged around the passage 13.

It will also be observed that the transport time for the fluid between the main passage 13 and the components 7 is reduced, thereby increasing the relevance of the measurements and analyses carried out.

In general, numerous other arrangements may be used.

Figure 7:
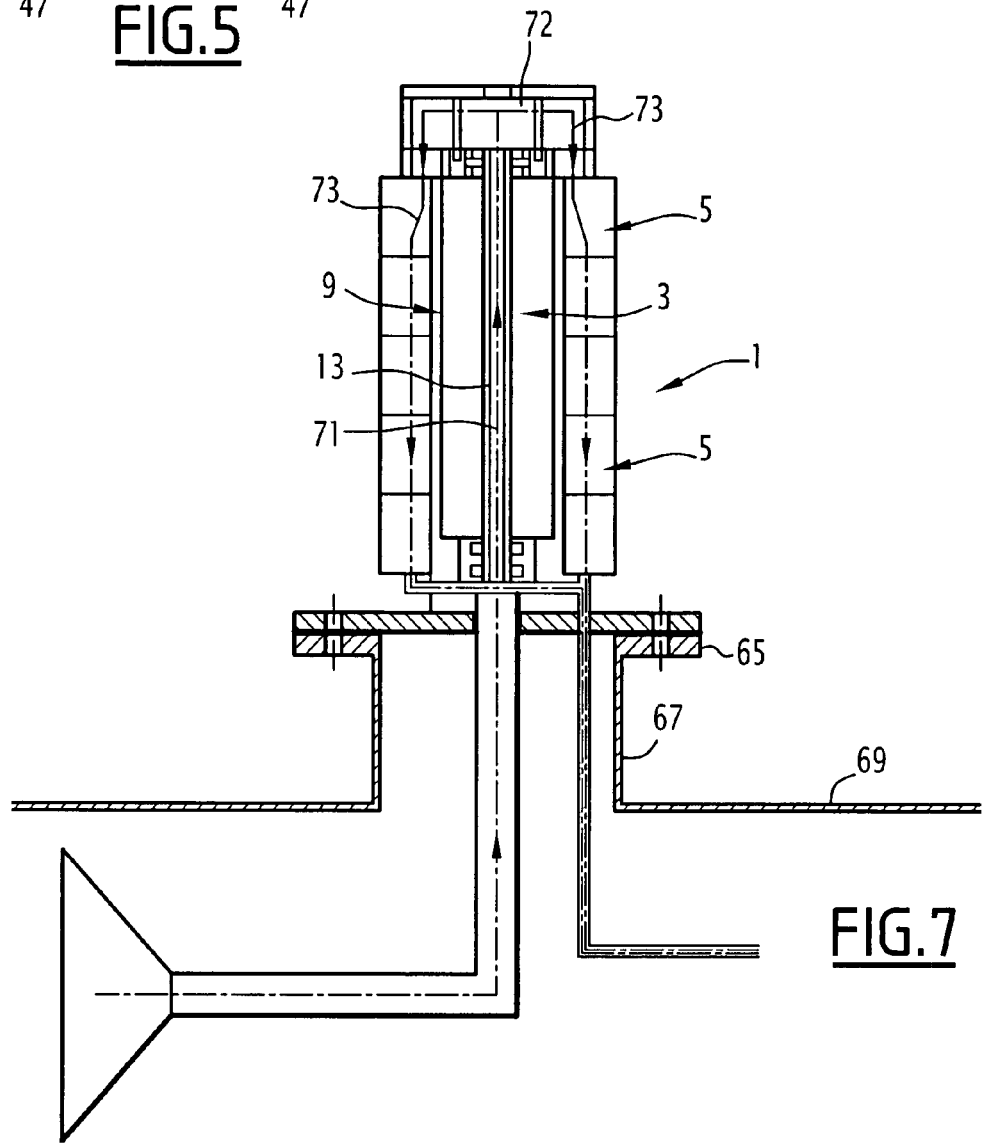
FIG. 7 is a diagrammatic side view illustrating a fluid distribution assembly according to another embodiment of the invention.

Thus, by way of example, FIG. 7 illustrates another embodiment in which the assembly 1 is mounted on a flange 65 of a branch connection 67 provided on a pipe 69 of an industrial installation.

As illustrated by the arrow 71, the fluid passes through the passage 13, which does not include a filtering member, flowing upwards (in FIG. 6), is filtered in an upper filter 72 integral with the body 3, and is then returned downwards in order, as illustrated by the arrows 73, to pass through the alignments of modules 5 provided along the faces 9, before being returned towards the pipe 69. It will be observed that the components 7 have not been shown in FIG. 6 in order not to overload it.

In general, other shapes of body 3 may be used, for example polygonal cross-sections other than square and the body 3 may be made in a plurality of parts.

Similarly, the number of support faces 9 may be varied, and may in particular be less than four. It is also possible, for example, to use a body 3 which has only one support face 9 for supporting modules. The simple fact of providing in the body 3 a passage 13 intended for the fluid makes it possible to save space.

Conversely, it is possible to use a body 3 having a plurality of support faces 9, each corresponding, for example, to the side of a polygon, without using an inner passage 13 in the body 9.

Still more generally, the passage 13 is not necessarily a passage intended to be traversed by the fluid. It may thus be, by way of example, a fluid accumulation passage, from which the fluid is expelled, after accumulation, by means of a piston in order to pass through the alignment(s) of modules 5 provided on the support face(s) 9 of the assembly 1.

Also in general, the holes 11 may be replaced by other fixing means, for example protuberances, and be arranged in the form of a regular pattern other than those described previously. That would be the case especially if the aforesaid standard were to evolve or be replaced by a standard imposing different constraints.

It will also be noted that the body 3, the modules 5 and the components 7 may be sold separately.

It will be observed that the above principles may be used in numerous fields and especially in industrial installations or vehicles.

The invention claimed is:

1. A fluid distribution assembly, comprising:
a body inside of which a passage for fluid is provided wherein the body has at least two support faces for supporting modules for channeling the fluid, each of said support faces having a regular network of means for fixing the modules,
said modules being configured to be capable of mounting functional components.

2. An assembly according to claim 1, wherein the fluid passage and the or each support face extend in a longitudinal direction.

3. An assembly according to claim 2, wherein the body has a polygonal cross-section, the or each support face forming one side of the polygon.

4. An assembly according to claim 3, wherein the body has as many support faces as the polygon has sides.

5. An assembly according to claim 1, wherein the fluid passage passes through the body from side to side.

6. An assembly according to claim 1, wherein the fixing means are holes provided in the or each support face of the body.

7. An assembly according claim 1, wherein the fixing means are distributed at the corners of squares.

8. An assembly according to claim 7, wherein the squares have sides with a length of 37 mm or 56 mm.

9. An assembly according to claim 1, wherein the assembly further comprises connecting members for connecting modules to one another, the modules being fixed on the or each support face and forming on the or each face a circuit for measuring or analysing the fluid.

10. An assembly according to claim 1, wherein the assembly further comprises functional components mounted on the modules in order to be fixed on the or each support face by means of the fixing means and in order to interact with the fluid.

11. An assembly according to claim 1, wherein the assembly comprises a filter for filtering the fluid, which filter is carried by the body.

12. A method of using an assembly according to claim 10, the method comprising a step of distributing with said assembly the fluid for supplying an engine of a vessel.

13. The method according to claim 12, wherein the fluid is oil.

14. A fluid distribution assembly, comprising:
a body extending in a longitudinal direction and having at least one support face for supporting modules for channeling fluid, said modules being configured to be capable of mounting functional components, wherein a passage for the fluid is provided inside the body and said support face has a regular network of means for fixing the modules on the support face in such a way that at least some of the modules are aligned one after another in the longitudinal direction and connected longitudinally to one another in order to form on the support face a longitudinally extending circuit for measuring or analysing the fluid.

15. An assembly according to claim 14, wherein the body has at least two support faces, each of which faces has a regular network of means for fixing the modules.

16. An assembly according to claim 14, wherein the fluid passage and the or each support face extend in a longitudinal direction.

17. An assembly according to claim 16, wherein the body has a polygonal cross-section, the or each support face forming one side of the polygon.

18. An assembly according to claim 17, wherein the body has as many support faces as the polygon has sides.

19. An assembly according to claim 14, wherein the fluid passage passes through the body from side to side.

20. An assembly according to claim 14, wherein the fixing means are holes provided in the or each support face of the body.

21. An assembly according claim 14, wherein the fixing means are distributed at the corners of squares.

22. An assembly according to claim 21, wherein the squares have sides with a length of 37 mm or 56 mm.

23. An assembly according to claim 14, wherein the assembly further comprises connecting members for connecting modules to one another, the modules being fixed on the or each support face and forming on the or each face a circuit for measuring or analysing the fluid.

24. An assembly according to claim 14, wherein the assembly further comprises functional components mounted on the modules in order to be fixed on the or each support face by means of the fixing means and in order to interact with the fluid.

25. An assembly according to claim 14, wherein the assembly comprises a filter for filtering the fluid, which filter is carried by the body.

26. A fluid distribution assembly comprising:
   a body inside of which a passage for fluid is provided, wherein the body has at least two support faces for supporting modules for channeling the fluid, each of said support faces having a regular network of means for fixing the modules wherein, said modules are configured to mount other components; and
   connecting members for connecting the modules to one another, wherein the modules are fixed on each support face and form on each support face a circuit for measuring or analysing the fluid.

27. A fluid distribution assembly kit, comprising individually the components of:
   a body inside of which a passage for fluid is provided, wherein the body has at least two support faces for supporting modules for channeling the fluid, each of said support faces having a regular network of means for fixing the modules, at least one module being configured to channel the fluid and to mount functional components, and the or each module being configured so as to be mountable to the support face of said body; and
   at least one connecting member configured to connect individual modules together.

28. A fluid distribution assembly kit, comprising individually the components of:
   a body inside of which a passgage for fluid is provided, wherein the body has at least two support faces for supporting modules for channeling the fluid, each of said support faces having a regular network of means for fixing the modules, at least one module being configured to channel the fluid and to mount functional components, and the or each module being configured so as to be mountable to the support face of said body;
   at least one connecting member configured to connect individual modules together; and
   at least one functional component configured to be mountable on one or more modules in order to interact with the fluid.

29. A fluid distribution assembly kit, comprising individually the components of:
   a body inside of which a passage for fluid is provided, wherein the body has at least two support faces for supporting modules for channeling the fluid, each of said support faces having a regular network of means for fixing the modules, at least one module being configured to channel the fluid and to mount functional components, and the or each module being configured so as to be mountable to the support face of said body.

* * * * *